US006734832B1

(12) United States Patent
Danowski et al.

(10) Patent No.: US 6,734,832 B1
(45) Date of Patent: May 11, 2004

(54) ANTENNA SWITCHING SYSTEM FOR A MOBILE COMMUNICATION DEVICE

(75) Inventors: Stephen F. Danowski, Davie, FL (US); Michael Gardner, Plantation, FL (US); Carlos M. Esquivia-Lee, Plantation, FL (US); Richard D. Alvarez, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/319,016

(22) Filed: Dec. 13, 2002

(51) Int. Cl.[7] .............................. H01Q 1/50; H04B 1/38

(52) U.S. Cl. ....................................... 343/906; 455/90.3

(58) Field of Search ................................. 343/702, 906, 343/872; 455/575.1, 569.1, 347, 90.3, 569.2

(56) References Cited

U.S. PATENT DOCUMENTS 6,007,378 A * 12/1999 Oeth .......................... 439/588
6,473,045 B1 * 10/2002 Duquerroy et al. ......... 343/702
6,625,425 B1 * 9/2003 Hughes et al. .............. 455/351

* cited by examiner

*Primary Examiner*—Minh A
(74) *Attorney, Agent, or Firm*—Scott M. Garrett

(57) ABSTRACT

A mobile communication device has a radio contact (110) that has a moveable portion (111) that is located in correspondence with a contact pad (106) of a circuit board of the (104) of the mobile communication device. The moveable portion is biased away form the contact pad. The radio contact is held in place by a boot (116) that is attached to the housing of the mobile communication device. An external connector has a connector contact (206) that has a moveable portion (210) for mating with the moveable portion of the radio contact. As the external connector is attached to the mobile communication device, the connector contact pushes the radio contact until it touches the contact pad, and then the moveable portion of the connector contact move to absorb any further travel of the external connector.

6 Claims, 2 Drawing Sheets

ANTENNA SWITCHING SYSTEM FOR A MOBILE COMMUNICATION DEVICE

TECHNICAL FIELD

This invention relates in general to external antenna connectors for mobile communication devices, and more particularly to connection scheme for automatically disconnecting the externally accessible portion of the antenna contacts when the mobile communication device is not connected to an external antenna.

BACKGROUND

Frequently mobile communication devices are used in conjunction with an external antenna. For example, there are accessories for cellular phones referred to as "car kits." A typical car kit receives the phone, and makes various electrical connections to the phone for providing power to the cellular phone and for connecting an external antenna to the cellular phone for increased performance, as is known in the art.

To facilitate switching the radio frequency signal path to the external antenna, the mobile communication device is provided with a radio frequency or RF connector so that the radio signal can be passed through the car kit instead of the antenna of the mobile communication device. Typically the RF connector is soldered to a circuit board of the mobile communication device and accessible through an opening in the housing of the mobile communication device. This arrangement causes a couple problems. First, the RF connector is typically exposed, and subject to being touched by the user of the mobile communication device, and degrading the radio performance of the mobile communication device, and also directly exposing the user to RF energy. Furthermore, the connector may be short circuited if the mobile communication device is, for example, carried in a user's pocket with coins. A short circuit would cause momentary loss of service, and potentially loss of a call under other circumstances. Therefore there is a need for an antenna switching system that avoids these problems.

BRIEF DESCRIPTION OF THE DRAWINGS

The features of the present invention, which are believed to be novel, are set forth with particularly in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
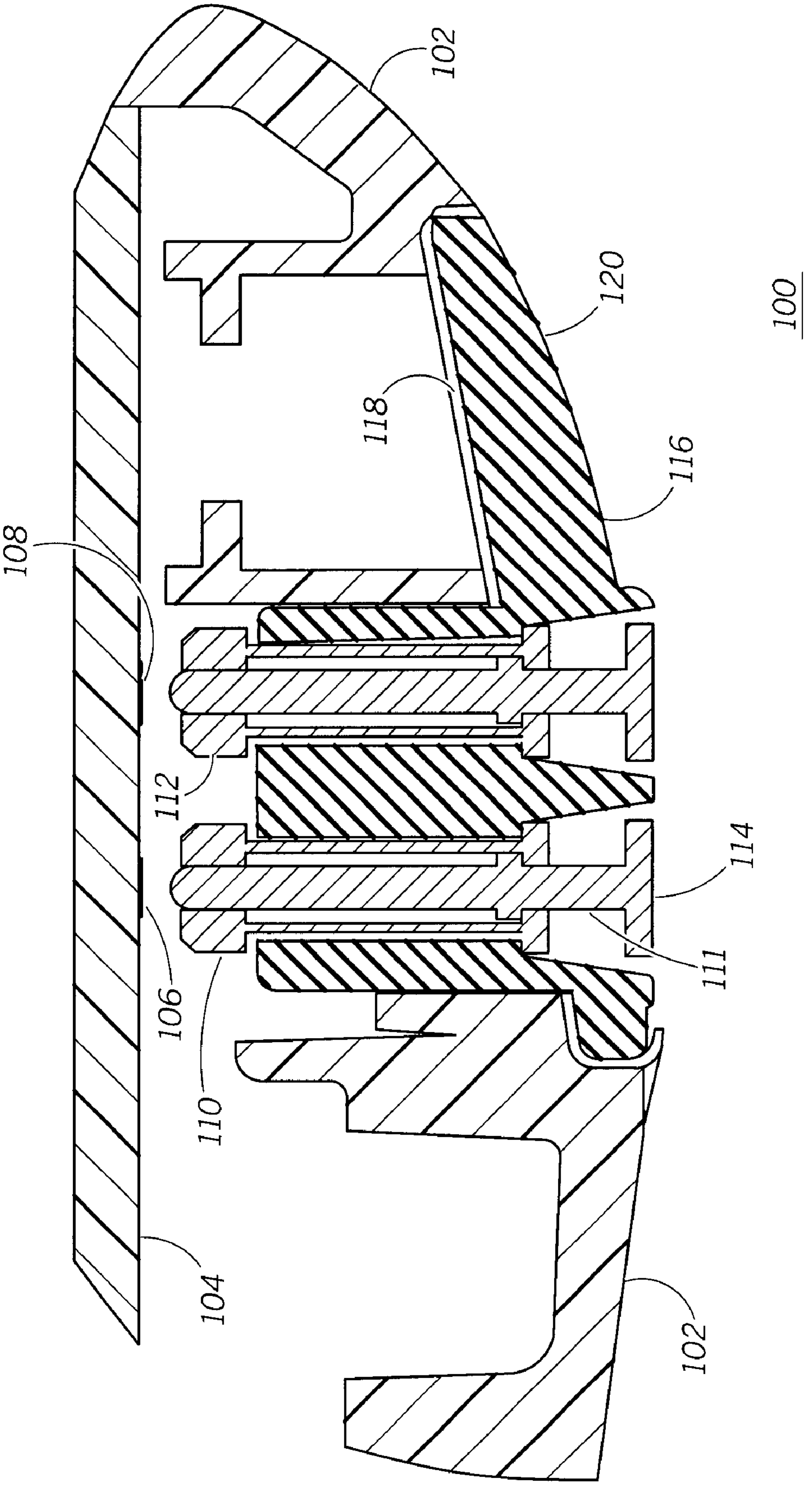
FIG. 1 shows a cut-away side view of a mobile communication device for use with the antenna switching system, in accordance with the inventions.

While the specification concludes with claims defining the features of the invention that are regarded as novel, it is believed that the invention will be better understood from a consideration of the following description in conjunction with the drawing figures, in which like reference numerals are carried forward.

The invention solves the problems typically associated with RF connectors for connecting a mobile communication device to an external antenna by use of moveable contacts that do not make contact with the mobile communication device circuit board unless pushed or otherwise urged towards the circuit board. The external connector comprises mating contacts that perform the required pushing or urging, but also move once the radio contacts have made contact with the circuit board of the mobile communication device. By allowing the connector contacts to move independently, any tolerance is absorbed and a reliable electrical path is formed.

Referring now to FIG. 1, there is shown a cut-away side view 100 of a mobile communication device for use with the antenna switching system, in accordance with the inventions. The mobile communication device comprises a housing 102 that is preferably formed of plastic. Inside the mobile communication device is a circuit board 104 for carrying electrical and electronic circuits of the mobile communication device. Disposed on the circuit board a first radio frequency contact (RF) pad 106 and preferably a second RF contact pad. Circuits of the mobile communication device generate and receive RF signals which, when the mobile communication device is connected to an external antenna as will be described, pass through these contact pads. A radio contact 110 is disposed in proximity to the contact pad 106. The radio contact has a moveable portion, such as axial portion 111, that is biased away from the contact pad 106. The moveable portion also has an external contact surface 114. In the preferred embodiment a second radio contact 112 is provided, and is substantially similar to the first radio contact, and is used for contacting a second RF contact pad 108. The radio contacts are used for passing RF signals in and out of the mobile communication device to an external device. In the preferred embodiment, one contact is for RF hot, meaning the actual RF signal, and the other is for RF ground, which is the reference potential for the signal on the RF hot path. The moveable portion is biased by use of, for example, an axial spring. In the preferred embodiment the radio contact is a pogo pin. The radio contact or contacts are held in place by a boot 116. Preferably the boot is comprised of a complaint material and has features for retaining the radio contacts. The boot is coupled or otherwise attached to the housing 102, and preferably by an adhesive on a label portion of the boot 118 that affixes the boot to the housing. Furthermore, it is contemplated that a label 120 may be placed on the boot. The boot defines an outer surface around the external contact portion of the radio contact, and the external portion of the radio contact sit below the outer surface. By below, it is meant that the external contact surface does not protrude out beyond the outer surface of the boot, and is recessed therein. By positioning the radio contacts in this manner, the potential for short circuiting them together by accidental contact with a conductor such as a coin is reduced, as is the potential for contact by the user of the mobile communication device.

Figure 2:
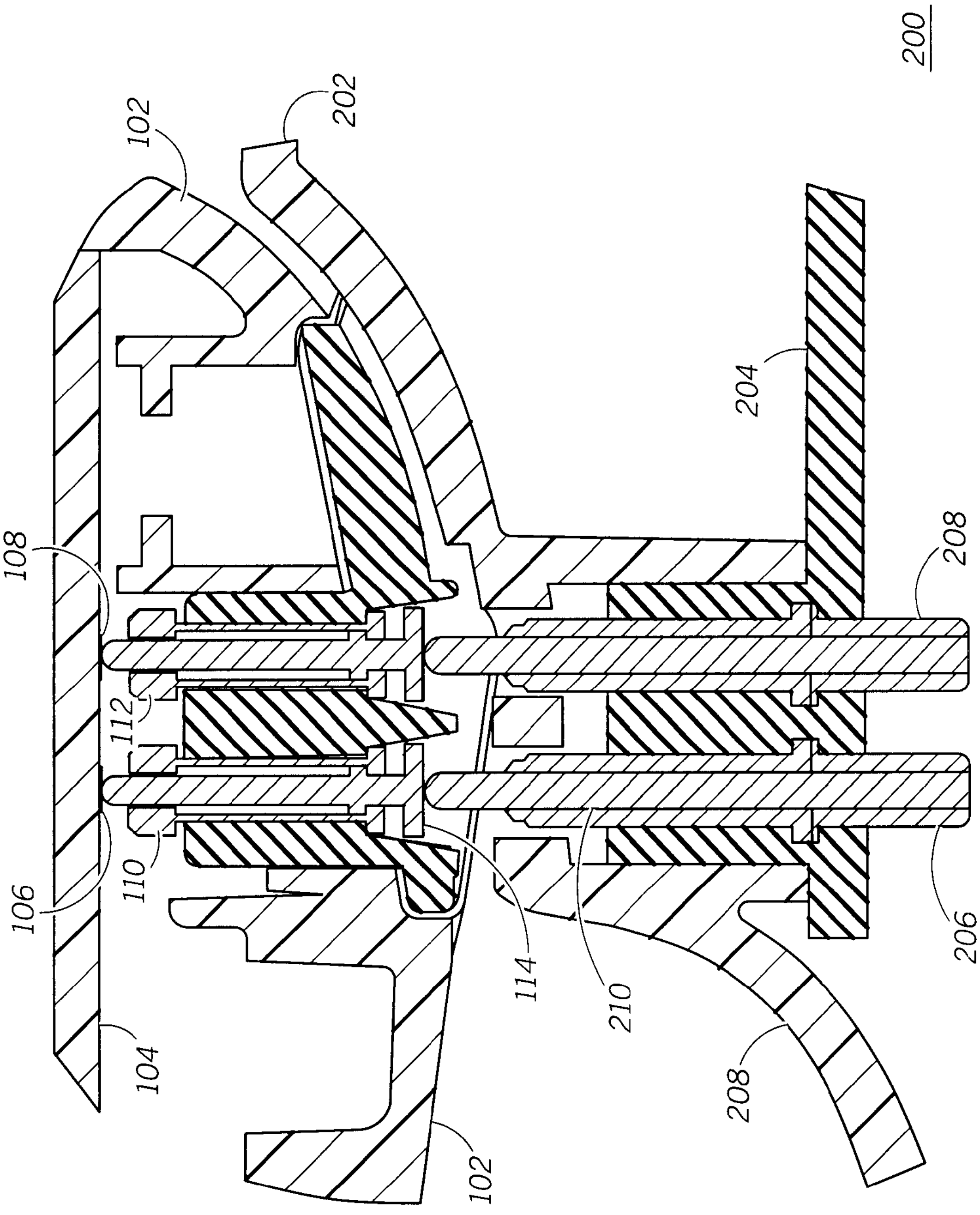
FIG. 2 shows a cut-away side view of a mobile communication device and external connector when the mobile communication device is connected to the external connector, in accordance with the invention.

FIG. 2 shows a cut-away side view 200 of a mobile communication device and external connector when the mobile communication device is connected to the external connector, in accordance with the invention. The external connector comprises a housing 202 and a connector circuit board 204 disposed therein. Mounted on the circuit board is a connector contact 206, and preferably a second connector contact 208. Each connector contact mates with a corresponding radio contact. The connector contacts also have a moveable portion 210, which is biased away from the connector circuit board 204. Like the radio contacts, the connector contacts may be pogo pins. However, the biasing of the moveable portion of the connector contact is stronger than the biasing of the moveable portion of the radio contact, so when the external connector is attached to the mobile communication device, the connector contact pushes the moveable portion of the radio contact towards the contact pad 106, until physical, and therefore electrical contact is made. At that point the moveable portion of the radio contact is unable to move any further, so the moveable portion of the connector contact moves as the external connector continues to be moved into place. This arrangement absorbs tolerances or variation in size so as to assure a reliable electrical connection. The connector circuit board 204 connects to an external antenna, preferably through a coaxial cable (not shown).

Therefore the invention solves the problem of exposed antenna contacts typical of many mobile communication devices by recessing the external contact portion of the radio connector and disengaging the radio connector from the RF path in the mobile communication device when not in use with an external connector, such as a car kit.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An antenna switching system for a mobile communication device, the mobile communication device having a circuit board with an antenna contact pad, the antenna switching system comprising:

a radio contact having moveable portion for making contact with the antenna contact pad, and being biased away from the contact pad, the moveable portion having an external contact surface, the radio contact for conducting a radio frequency signal;

a boot for holding the radio contact, the boot being coupled to a housing of the mobile communication device and wherein the external contact surface of the radio contact is below an outer surface of the boot; and an external connector for connecting to the mobile communication device and having a connector contact for electrically connecting to the radio contact for receiving the radio frequency signal, the connector contact being mounted on a connector circuit board and having a moveable portion, the moveable portion of the connector contact being biased away from the connector circuit board;

wherein, upon connecting the connector to the mobile communication device, the moveable portion of the connector contact meets the external contact surface of the radio contact, thereby pushing the moveable portion of the radio contact to form an electrical connection between the circuit board of the mobile communication device and the connector circuit board; and wherein the biasing of the radio contact and the connector contact is such that the moveable portion of the radio contact begins to move before the moveable portion of the connector contact.

2. An antenna switching system for a mobile communication device as defined in claim 1, wherein the radio contact is a first radio contact, the connector contact is a first connector contact, the antenna switching system further comprises:

a second radio contact disposed in the boot, the second radio contact being substantially similar to the first radio contact and for making electrical contact with a second contact pad of the radio circuit board; and a second connector contact disposed in the external connector and mounted on the connector circuit board, the second connector contact being substantially similar to the first connector contact and for making electrical contact with the second radio contact.

3. An antenna switching system for a mobile communication device as defined in claim 2, wherein the first radio and connector contacts provide an RF hot path, the second radio and connector contacts provide an RF ground path.

4. An antenna switching system for a mobile communication device as defined in claim 1, wherein the radio contact and the connector contact are axial pogo pins.

5. An antenna switching system for a mobile communication device as defined in claim 1, wherein the boot is comprised of a compliant material and has features for retaining the radio contact.

6. An antenna switching system for a mobile communication device as defined in claim 1, wherein the external connector is a portion of a car kit.

* * * * *